June 10, 1952  A. L. CRIDER  2,600,049
KITE REEL
Filed July 5, 1950
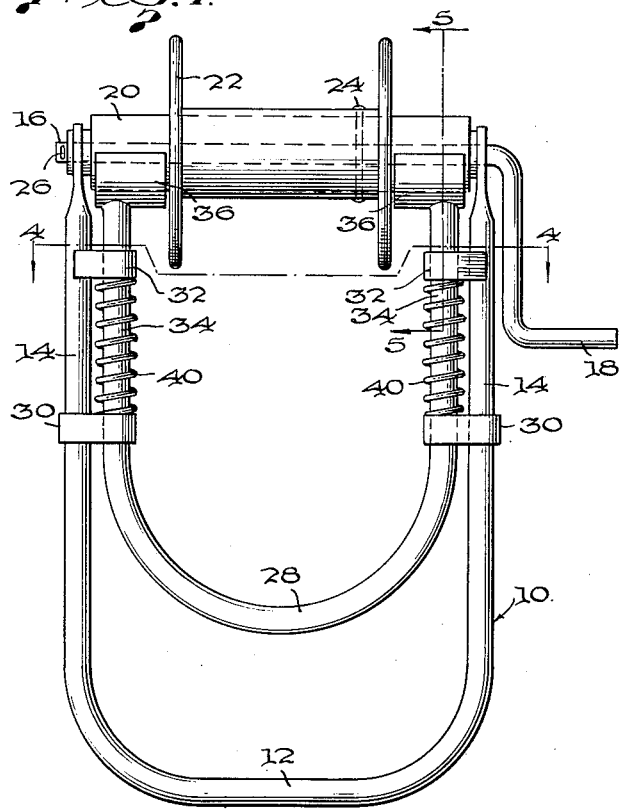
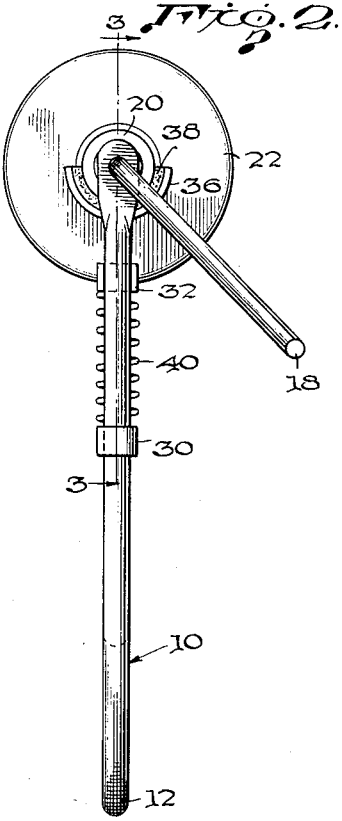
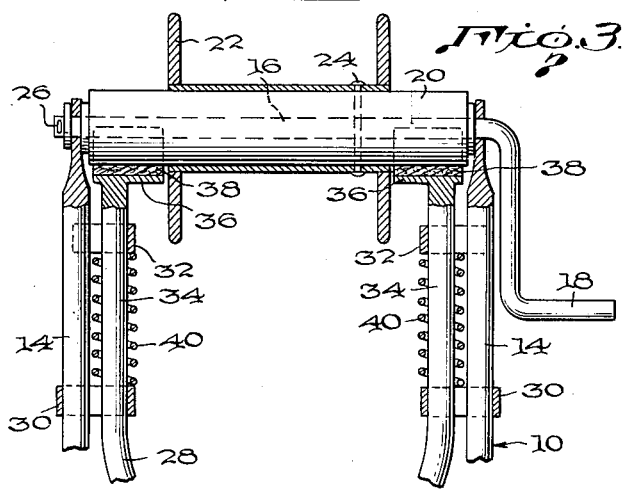
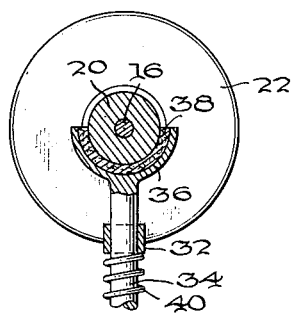
INVENTOR.
ALVIN L. CRIDER
BY
Raymond N. Matson
AGENT Patented June 10, 1952

2,600,049

UNITED STATES PATENT OFFICE 2,600,049

KITE REEL

Alvin L. Crider, Hot Springs, Ark.

Application July 5, 1950, Serial No. 172,041

7 Claims. (Cl. 242—99)

This invention relates generally to reeling devices and more particularly to a portable reel for kite lines, etc.

Reels of this general type are known in the art but are usually characterized by a number of inherent disadvantages. Among these objectionable characteristics are an excessive weight, a lack of rigidity and stability so as to result in erratic reeling and unreeling operations, an overly complicated or too fragile breaking and/or reel locking system, and a bulkiness which affects both transportation and storage problems for a device of this type.

Accordingly the chief object of the present invention is to provide an improved portable reel for kite lines, etc., which will obviate the objectionable features of the prior art.

Another important object of the present invention is to provide a compact lightweight, portable reel which is so constructed as to be strong and rigid so as to eliminate reel wobbling and yet facilitate reeling and unreeling operations.

A further important object of the present invention is to provide a portable reel structure having an improved breaking means so arranged as to be operable by one hand to permit, slow up, or stop the rotation of the reel.

Another important object of the present invention is to provide a portable reel having a double supporting handle arranged for relative movement to effect a one-handed control of the braking of the reel rotation and to eliminate the tendency of the reel as a whole to rotate about the palm of the hand as an axis.

Another object of the invention is to provide an improved reel and brake which is simple in design, rugged in use, easy to carry or store, and susceptible of ready and economical manufacture.

Other objects and advantages of the invention will become apparent during the course of the following description.

In the drawings I have shown one embodiment of the invention. In this showing:

Figure 1 is a front view in elevation of the invention;

Figure 2 is a side view thereof;

Figure 3 is a fragmentary central vertical sectional view of the invention taken on the line 3—3 of Figure 2;

Figure 4 is a horizontal sectional view of the invention taken on the line 4—4 of Figure 1; and Figure 5 is a fragmentary vertical sectional view of the invention taken on the line 5—5 of Figure 1.

Referring to the drawings, numeral 10 designates the invention as a whole which comprises a U-shaped main handle portion 12 having a pair of legs 14, the ends of which include apertures for the reception of a reel shaft 16 which terminates at one end in a crank 18.

A tubular section 20 is mounted on the shaft 16 (and may be fixed thereto or integral therewith) between the legs 14 and acts as an enlargement of the shaft for a purpose which will become apparent. A reel 22 is mounted on the tube 20 midway between its ends and both are keyed to the shaft 16 by a pin 24 or other suitable means. Thus the tube 20 acts as a hub for the reel 22 and projects on each side thereof. Accidental spreading of the legs 14 is prevented by a washer and second pin 26. It will thus be seen that the main handle 12 and the shaft 16 form a strong rigid frame which can readily withstand reeling and unreeling strains without wobbling or twisting of the reel with respect to the handle.

A second U-shaped handle 28 is mounted for sliding movement with respect to the main handle 12 and is positioned in the plane of and between the legs 14 by means of loops 30 fixed to the legs 14 and by guide bars 32 fixed to the legs 34 of the handle 28. The extremities of the legs 34 have arcuate brake shoes 36 fixed thereto which include wear linings 38, both conforming to the outer periphery of the tube 20. The shoes 38 are constantly urged against the surface of the tube by means of a pair of compression springs 40 which surround the legs 34 and act against the loops 30 and guide bars 32. The brake shoes thus operate as a positive automatic stop or brake for the reel 22 under the action of the springs 40.

An important feature of the invention resides in the combination provided by the two handles 12 and 28. When in use, the handle 12 rests in the palm of the hand while the fingers are curled around the handle 28 at about the first joint. Squeezing of the handles together causes handle 28 to move toward the main handle 12 against the action of the springs 40 to effect the release to varying degrees of braking pressure upon the periphery of the hubs or reel tube 20, or to release the brake entirely. Thus reeling and unreeling operations can be effected at any desired speed depending upon the movement of the brake shoes 36 away from the periphery of the hubs 20 as the handles are squeezed toward each other. It will be noted that the releasing of the brakes does not effect the original stability of the reel 10.

Another important feature of the invention resides in the additional steadying support provided by the combination of the two handles 12 and 28. In the absence of the handle 28, the reel 10 would tend to swing about the main handle 12 as an axis during reeling operations or the carrying of the reel 10. The handle 28 eliminates this tendency and enables the reel to be steadied by the fingers of the hand. Thus the double handle arrangement steadies the position of the reel 10 in the hand while enabling the rate of reeling to be accurately controlled.

In use, the outer end of the length of cord, etc. stored upon the reel 22 is attached to the object, such as a kite, which is to be reeled. Upon getting a kite initially into the air in the usual manner, its further ascent may be permitted in a simple trouble free manner and at the desired rate of speed while holding the reel 10 in either hand and by merely squeezing the steadying handle 28 toward the main handle 12. Thus unreeling operations require only the use of a single hand. When it is desired to reel in the kite, etc., the two handles are squeezed toward each other by one hand while the crank 18 is manipulated by the other. Upon completion of the reeling, the brake shoes 36 are permitted to reengage the periphery of the reel hubs 20 under the action of the springs 40 to prevent further reel rotation.

It will now be apparent that the reel forming the present invention may be conveniently held and steadied in a single hand while also simultaneously controlling the operation of the brakes to regulate the reeling or unreeling operations. The mounting of the steadying and brake controlling handle 28 within the legs of the main handle 12 ensures protection to the moving parts in that the handle legs 14 act as guards. The compactness and lightweight of the reel 10 further ensures its durability and desirability for the purpose intended.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A portable reel for kites comprising a handle, a shaft including a crank rotatably mounted in the ends of said handle, a reel having projecting hubs fixed to said shaft, a second handle mounted on said first handle for relative movement with respect thereto, brake shoes fixed to said second handle adjacent said hubs, and means for effecting relative motion of said handles to effect engagement of said brake shoes with said hubs.

2. A portable reel for kites comprising a handle, a shaft including a crank rotatably mounted in the ends of said handle, a reel having projecting hubs fixed to said shaft, a second handle mounted on said first handle for relative movement with respect thereto, arcuate brake shoes fixed to the ends of said second handle adjacent said hubs, and spring means acting between said handles to urge said brake shoes against the periphery of said hubs.

3. A one-handed portable reel comprising a main U-shaped handle, a reel including projecting hub portions rotatably mounted in the ends of said handle, a second handle mounted on and in the plane of said main handle for relative movement with respect thereto, arcuate brake shoes fixed to the ends of said second handle adjacent said hubs, and spring means acting on said handles to urge said brake shoes against the periphery of said hubs.

4. A one-handed portable reel comprising a main U-shaped handle, a reel including projecting hub portions rotatably mounted in the ends of said handle, a second handle mounted on and in the plane of said main handle for relative movement with respect thereto, arcuate brake shoes fixed to the ends of said second handle adjacent said hubs, and spring means acting on said handles to urge said brake shoes against the periphery of said hubs, said second handle acting to prevent rotation of the reel about the main handle as an axis when said main handle is positioned in the palm of the hand and said second handle is engaged by the fingers.

5. A one-handed portable reel comprising a main U-shaped handle, a reel including projecting hub portions rotatably mounted in the ends of said handle, a second handle mounted on and in the plane of said main handle for relative movement with respect thereto, arcuate brake shoes fixed to the ends of said second handle adjacent said hubs, and spring means acting on said handles to urge said brake shoes against the periphery of said hubs, said second handle acting to release the brake shoes from the hubs when moved toward said main handle by pressure of the fingers.

6. A one-handed portable reel comprising a main U-shaped handle, a reel including projecting hub portions rotatably mounted in the ends of said handle, a second handle mounted on and in the plane of said main handle for relative movement with respect thereto, arcuate brake shoes fixed to the ends of said second handle adjacent said hubs, and spring means acting on said handles to urge said brake shoes against the periphery of said hubs, one of said handles being positioned within the area defined by said reel and said other handle.

7. A one-handed portable reel comprising a main U-shaped handle, a reel including projecting hub portions rotatably mounted in the ends of said handle, a pair of lugs mounted on the legs of said handle, a second handle slidably mounted in said lugs, a second pair of lugs mounted on said second handle at points spaced from said first lugs and engaging said first handle, arcuate brake shoes fixed to the ends of said second handle adjacent said hubs, and spring means acting between the pairs of lugs on each handle to urge said brake shoes against the periphery of said hubs.

ALVIN L. CRIDER.

REFERENCES CITED

The following references are of record in the file of this patent:

UNITED STATES PATENTS

| Number | Name | Date |
|---|---|---|
| 896,765 | Sears | Aug. 25, 1908 |
| 1,067,643 | Christner et al. | July 15, 1913 |
| 1,120,821 | Kennelly | Dec. 15, 1914 |
| 1,878,041 | Voss | Sept. 20, 1932 |
| 2,333,632 | Benson | Nov. 9, 1943 |
| 2,466,688 | Culver | Apr. 12, 1949 |